2,958,599
Patented Nov. 1, 1960

2,958,599

DIAZO COMPOUNDS AND PRINTING PLATES MANUFACTURED THEREFROM

Wilhelm Neugebauer, Wiesbaden-Biebrich, Germany, assignor, by mesne assignments, to Azoplate Corporation, Murray Hill, N.J., a corporation of New Jersey No Drawing. Filed Feb. 14, 1958, Ser. No. 715,225

24 Claims. (Cl. 96—33)

The present invention relates to the photomechanical production of images and printing plates. More particularly, it pertains to a process of making images and especially printing plates using light-sensitive material coated with a light-sensitive layer of orthoquinone diazides, a special group of diazo compounds.

In U.S. patent application Serial No. 174,556, filed on July 18, 1950, by Maximilian Paul Schmidt and now abandoned, a process has been described for the production of images, in particular of printing plates, by means of diazo compounds, which calls for the following procedure: diazo compounds insoluble in water which are derived from 2-diazo-naphthol-(1)- or 1-diazo-naphthol-(2) and have the chemical constitution of esters or amides of a sulfo-acid or a carboxylic acid of these diazo naphthols are used to produce a light-sensitive layer on a base material; this layer is then exposed to actinic light under a master pattern, and the image is developed with alkali and subsequently heated.

In the above cited patent application Serial No. 174,556 it has also been pointed out that it is possible to add resins or fatty acids to the diazo compounds or to apply such resins or fatty acids to the base material as an intermediate layer between the base and the light-sensitive layer; the heating, furthermore, can be omitted and the process may also be carried out without the use of resins or fatty acids.

The U.S. patent applications Serial Nos. 202,403, filed December 22, 1950, and 208,055, filed January 26, 1951, both by Maximilian Paul Schmidt; Serial No. 238,369, filed July 24, 1951, by Oskar Süs and Serial No. 268,148, filed January 24, 1952, by Oskar Süs and Maximilian Paul Schmidt, all now abandoned, describe the use of other groups of diazo compounds that are insoluble in water and belong to the category of orthoquinone diazides.

All the inventions covered by the above mentioned patent applications pertain to positive working processes or to the production of positives from positive master patterns or of negatives from negative master patterns.

The present invention pertains in addition to positive working processes wherein as stated above alkali is used as developing agent, to negative working processes by means of which negative printing plates can be obtained from positive master patterns and vice-versa, positive printing plates can be obtained from negative master patterns by the use of specific water-insoluble diazo compounds of the category of ortho-quinone diazide sulfonic acid esters, if the light-sensitive material described, subsequent to the exposure of the diazo compound layer to actinic light is treated with an acid. In certain cases it may be desirable to use a mixture containing both an acid and an organic solvent. It will be understood that the light-sensitive material may be exposed to a projected light image as well as to a light image formed by contact exposure with a master pattern.

The compounds useful in the present invention are those having the formula

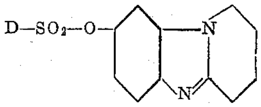

in which D is an ortho-quinone diazide radical.

When proceeding in accordance with this invention, the heating operation suggested as the last step of the process described in application Serial No. 174,556, now abandoned, can be omitted in most cases.

This invention is based on the fact that the behaviour of the water insoluble quinone-diazides when treated with one or the other chemical treating agent is different from the behavior of their light-transformation products in particular with respect to the adhesion to the base material, especially, if metal foils or metal sheets are used as the base support. On exposure to actinic light the quinone-diazides are believed to turn into carboxylic acids of five-membered carbocycles; thus cyclo-pentadiene-carboxylic acids are obtained from the quinone-diazides of the benzene series, and indene-carboxylic acids originate from the quinone-diazides of the naphthalene series (compare O. Süs, "Liebig's Annalen der Chemie," volume 556, page 65 (1944). In addition to these acids which constitute readily coupling azo components azo dyes can possibly form at the places affected by light due to the coupling of undecomposed quinone-diazides with the carboxylic acids resulting from the action of light.

For removing the diazo compound which remained unchanged under the dense areas of the master in the course of the exposure to light aqueous solutions of mineral acids such as phosphoric acid, sulfuric acid, hydrochloric acid or nitric acid or of organic acids, such as formic acid, acetic acid, oxalic acid, citric acid and the like, are very well suited. Acid salts such as sodium bisulfate may also be used. The solutions of these acids may be applied to the exposed material by any suitable means, e.g. with the aid of a cotton swab or the exposed material may be bathed or immersed therein. Thickening agents, like dextrin, gum arabic, water-soluble cellulose ethers or similar substances, can be added to the acid solution and the action of the acids may be tempered by the addition of buffer salts. Frequently, the addition of salts like sodium chloride, calcium chloride, ammonia chloride or magnesium sulfate will also prove of advantage. Water-soluble organic solvents, like lower aliphatic alcohols, e.g. methanol, ethanol, propanol, ethylene-chlorohydrine, glycol, glycol-mono-alkyl ethers, diglycol or triglycol, furthermore acetone, tetrahydrofuran, dioxane and the like, can also be added to the solution with advantage. The addition of salts frequently proves of advantage also when water miscible organic solvents are used.

When developing agents made up of water and water-miscible organic solvents (which may contain salts dissolved therein) are used, positive images from negative master patterns are also obtained. In this case the addition of acids is not absolutely necessary, however it proves of advantage.

The development can be effected also with water-immiscible organic solvents, like benzene, xylene, etc., or with dispersions of such solvents in water that may contain acids, thickening agents or salts. Mixtures of water-immiscible solvents with water-miscible solvents can also be employed. It is possible, furthermore, to use mixtures of several water-immiscible solvents. In this case it does not necessarily prove of disadvantage, the results, on the contrary, being decidedly favorable in some instances, if solvents are added that do not readily dissolve the diazo compounds in question, as is the case with most of the low aliphatic hydro-carbons, e.g. gasolene.

The preparation of the diazo compounds to be used for the production of the light-sensitive layer in accordance with this invention which constitutionally represent esterified sulfo acids of ortho-quinone diazides and which are insoluble in water while being soluble in organic solvents, can be performed by known methods. Insofar as the methods of preparation are not already known from the literature, they have been described in detail in the following examples.

For coating the base material, it is possible to use mixtures of two or more light-sensitive o-quinone diazides. In some instances an improvement of the layers can be achieved in this manner. This applies, in particular, to the o-quinone diazides that have a stronger tendency to crystallize. In these instances the use of mixtures of the diazo compounds results in uniform varnish-like layers that prove strongly resistant to abrasion when applied to the base material.

Metallic bases of the kind customarily used in planographic printing, for instance, aluminum or zinc or possibly brass, and furthermore lithographic stones, are primarily suited as base materials. The surfaces of these materials may be pretreated either mechanically by brushing, sandblasting or similar means, or chemically, e.g. by phosphate bath treatment or electrochemically in known and customary manner.

For coating the base material, the diazo compounds to be used according to this invention are dissolved in an organic solvent, e.g. alcohol, dioxane, glycol ether, etc., or in a mixture of several solvents and are applied to the base by brushing, whirlcoating, spraying, immersion, roller application or any other method and are then dried.

For the purpose of facilitating the control of the exposure, dyes can be added to the sensitizing solutions which bleach out under the influence of light or compounds that get colored when exposed to light may be added, e.g. small quantities of diazo-salicylic acid which yields a red dye when exposed to light. The developed image is rendered more visible to the eye if dyes are added to the coating solutions, e.g. a small quantity of eosin (Schultz, "Farbstofftabellen," 7th edition, volume 1, page 375, Nr. 883). The same effect can be achieved by the use of o-quinone diazides derived from dyes, for example, o-quinone diazides which are also azo dyes; i.e. they have at least one auxochromic group in the part of the molecule connected to the sulfo acid group by esterification or amidation.

The light-sensitive layers obtained with water-insoluble o-quinone diazides in accordance with this invention can be stored for a considerable period of time in unexposed condition, and thus presensitized light-sensitive foils ready for use can be made available by the invention.

The following compounds which are referred to in the following examples represent ortho quinone diazides which are useful according to the present invention. The parts stated in the examples are parts by weight, if not otherwise indicated.

FORMULA 1

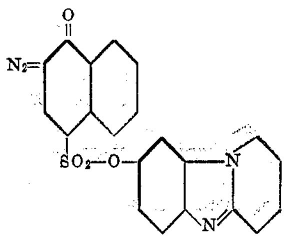

FORMULA 2

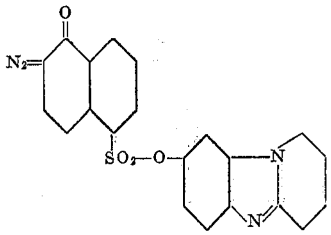

FORMULA 3

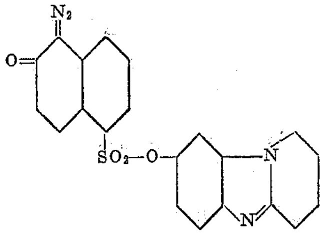

FORMULA 4

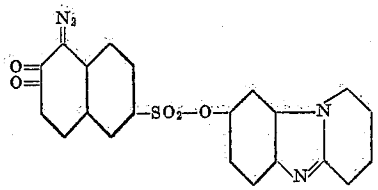

FORMULA 5

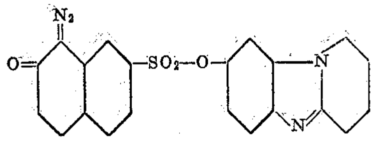

FORMULA 6

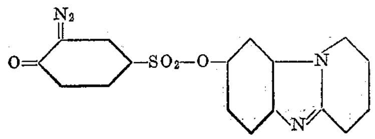

*Example 1*

A 1.5% solution of the compound corresponding to Formula 1 in ethylene glycol monomethyl ether is coated by means of a plate whirler onto a brushed aluminum foil or grained zinc plate, and the coated solution is subsequently dried. After drying the light sensitive layer is exposed under a positive transparent pattern, and the exposed layer is then developed first by means of a 1% phosphoric acid, then by means of an aqueous solution containing 0.6% of phosphoric acid and 16% of gum arabic. A negative image of the pattern is obtained. The foil is now inked with greasy ink and used as a printing plate.

Development of the exposed layer with solvents is also possible. Suitable solvents are, e.g.: tetrahydronaphthalene, xylene, ethyl alcohol, and the like. By means of these solvents, too, the unexposed parts of the diazo layer are easily removed, while the light struck parts of the layer remain undissolved and adhere to the support. After thus removing the unexposed parts by means of solvents, the uncovered metal is made water-bearing in the usual and customary manner, i.e. by a short wiping over with dilute phosphoric acid. The printing plate is now ready to be mounted on a printing apparatus.

If, after exposure under a positive pattern, the layer is wiped over with a 3% aqueous solution of trisodium phosphate, a positive image of the pattern is obtained. After said development of the foil is rinsed with water, wiped over on its imaged surface with dilute phosphoric acid (0.5%), and may now be used as a printing plate. Similar results are obtained by developing the layer, after exposure under a positive master, with an aqueous solution containing per 100 parts by vol. 1 part by weight of trisodium phosphate and 4 parts by weight of disodium phosphate. A positive printing plate is obtained from a positive master.

The compound corresponding to Formula 1 is prepared as follows:

40.5 g. of 6-hydroxy-(1′,2′-1,2)-pyridobenzimidazole are dissolved in 1.6 l. of warmed ethylene glycol monomethyl ether. After cooling the solution to 25° C., 68 g. of naphthoquinone-(1,2)-diazide-(2)-4-sulfochloride are first added and then, while agitating, 200 cc. of a 10% sodium carbonate solution are added drop by drop. The reaction mixture is stirred for another hour at a temperature of 25° C., then heated for one hour on a water bath to 40° C., and finally cooled down. The precipitating crystals are separated by means of a suction filter, suspended first in a luke warm sodium carbonate solution, then repeatedly in luke warm water, drawn off again, and finally dried in a vacuum at 40° C. After recrystallization from ethylene glycol monomethyl ether the compound forms yellow crystals which begin to decompose at 140° C.

The 6-hydroxy-(1′,2′-1,2)-pyridobenzimidazole is prepared according to the method described by L. Schmid and H. Czerny in "Monatshefte der Chemie," vol. 83, pages 31–35 (1952).

The naphthoquinone-(1,2)-diazide-(2)-4-sulfochloride is prepared from the sodium salt of the corresponding sulfonic acid by treating this sulfonic acid for several hours with ten times its own quantity of chlorosulfonic acid at a temperature of 50° C. and pouring the mixture into water. The naphthoquinone-(1,2)-diazide-(2)-4-sulfochloride thus obtained melts at 148° C.

*Example 2*

A 1.5% solution of the compound corresponding to Formula 2 in ethylene glycol monomethyl ether is coated by means of a plate whirler on to an anodically oxidised aluminum foil, and the coated solution is subsequently dried. After drying, the light sensitive layer is exposed under a positive transparent pattern, and the exposed layer is developed first by means of an aqueous solution containing 0.6% of phosphoric acid and 16% of gum arabic, then with a 1% phosphoric acid. A negative image of the pattern is obtained. The foil is now inked with greasy ink and used as a printing plate.

If, after exposure under a positive pattern, the layer is wiped over with a 3% aqueous trisodium phosphate solution, a positive image of the pattern is obtained. After said development the foil is rinsed with water, wiped over on its imaged surface with dilute phosphoric acid (0.5%) and may now be used as a printing plate.

The compound corresponding to Formula 2 is prepared as follows:

10 g. of 6-hydroxy-(1′,2′-1,2)-pyridobenzimidazole are dissolved in 350 cc. of warmed ethylene glycol monomethyl ether. After cooling the solution to 25° C., 16.7 g. of naphthoquinone-(1,2)-diazide-(2)-5-sulfochloride are added, and subsequently, while agitating and dropwise, 50 cc. of a 10% sodium carbonate solution. The reaction mixture is agitated for another hour at 25° C., then heated for one hour at 40° C. and finally cooled down. The precipitating crystals are separated by means of a suction filter, suspended first in a luke-warm sodium carbonate solution, then repeatedly in luke-warm water, drawn off again, and finally dried in a vacuum at 40° C. After recrystallization from ethylene glycol monomethyl ether the compound forms a yellow powder which begins to decompose at 140° C.

Naphthoquinone-(1,2)-diazide-(2) - 5-sulfochloride is prepared from the sodium salt of the corresponding sulfonic acid by treating it for several hours with ten times its own quantity of chlorosulfonic acid at 50° C. and pouring the mixture into water. The naphthoquinone-(1,2)-diazide-(2)-5-sulfochloride thus obtained melts at 139° C. with decomposition.

*Example 3*

A 1.5% solution of the compound corresponding to Formula 3 in a dimethyl formamide/ethylene glycol monomethyl ether mixture (1:1) is coated by means of a plate whirler onto a grained aluminum foil, and the coated solution is subsequently dried. After drying, the light sensitive layer is exposed under a transparent positive pattern, and the exposed layer is developed first with an aqueous solution containing 0.6% of phosphoric acid and 16% of gum arabic, then with a 0.5% phosphoric acid. A negative image of the pattern is obtained. The foil may now be inked with greasy ink and used as a printing plate.

If, after exposure under a positive pattern, the layer is wiped over with a 3% aqueous trisodium phosphate solution, a positive image of the pattern is obtained. After said development the foil is rinsed with water, wiped over on its imaged surface with dilute phosphoric acid (0.5%), and may now be used as a printing plate.

The compound corresponding to Formula 3 is prepared as follows:

10 g. of 6-hydroxy-(1′,2′-1,2)-pyridobenzimidazole are dissolved in 350 cc. of warmed ethylene glycol monomethyl ether. After cooling the solution to 25° C., first 16.7 g. of naphthoquinone-(1,2)-diazide-(1)-5-sulfochloride are added and then, while agitating and drop by drop, 50 cc. of a 10% sodium carbonate solution. The reaction mixture is agitated for two hours at 25° C., then heated for half an hour in a water bath to 40° C., and finally cooled down. The precipitating crystals are separated by means of a suction filter and suspended first in a luke-warm sodium carbonate solution, then repeatedly in luke-warm water, drawn off again, and finally dried in a vacuum at 40° C. After recrystallization from ethylene glycol monomethyl ether the compound forms a yellow powder which begins to decompose at 160° C.

The naphthoquinone-(1,2)-diazide-(1)-5-sulfochloride is prepared from the corresponding sulfonic acid which is heated for 1½ hours to 60° C. together with ten times its own quantity of chlorosulfonic acid, whereupon the mixture is poured onto ice. The precipitating napthoquinone-(1,2)-diazide-(1)-5-sulfochloride is then recrystallized from benzene. It melts at 145–146° C. with decomposition.

*Example 4*

A 1.5% solution of the compound corresponding to Formula 4 in ethylene glycol monomethyl ether is coated by means of a plate whirler onto an aluminum foil, which may be either unbrushed or roughened, and the coated solution is subsequently dried. After drying, the light sensitive layer is exposed under a transparent positive pattern and the exposed layer is developed to a negative image by means of an aqueous solution containing 0.6% of phosphoric acid and 16% of gum arabic. The foil is now inked with greasy ink and used as a printing plate.

If, after exposure under a positive pattern, the layer is wiped over with a 3% aqueous trisodium phosphate solution, a positive image of the pattern is obtained. After said development the foil is rinsed with water, wiped over on its imaged surface with dilute phosphoric acid (0.5%), and may now be used as a printing plate.

The compound corresponding to Formula 4 is prepared as follows:

1.3 g. of 6-hydroxy-(1′,2′-1,2)-pyridobenzimidazole are dissolved in 50 cc. of warmed ethylene glycol monomethyl ether. After cooling the solution to 25° C., first 2 g. of naphthoquinone-(1,2)-diazide-(1)-6-sulfochloride are added and subsequently, while agitating and drop by drop, 7 cc. of a 10% sodium carbonate solution. The reaction mixture is stirred for another hour at 25° C., then heated for 15 min. on a water bath to 40° C., and finally cooled down. The precipitating crystals are separated by means of a suction filter, suspended first in a luke-warm sodium carbonate solution, then repeatedly in warm water, drawn off again, and finally dried in a vacuum at 40° C. After recrystallization from ethylene glycol monomethyl ether the compound corresponding to Formula 4 forms a yellow powder which begins to decompose at 150° C.

The naphthoquinone-(1,2)-diazide-(1)-6-sulfochloride is prepared from the corresponding sulfonic acid by heating this substance for 1 hour to 90° C. with ten times its own quantity of chlorosulfonic acid and pouring the mixture onto ice. After recrystallization from benzene the naphthoquinone-(1,2)-diazide-(1)-6-sulfochloride thus obtained melts at 151° C. with decomposition.

*Example 5*

A 1.5% solution of the compound corresponding to Formula 5 in a dimethyl formamide/ethylene glycol monomethyl ether mixture (1:1) is by means of a plate whirler coated onto an aluminum foil roughened by sand blasting, and the coated solution is subsequently dried. After drying the light sensitive layer is exposed under a transparent positive pattern and the exposed layer is developed with an aqueous solution containing 0.6% of phosphoric acid and 16% of gum arabic to form a negative image of the pattern. The foil is now inked with greasy ink and used as a printing plate.

If, after exposure under a positive pattern, the layer is wiped over with a 3% aqueous trisodium phosphate solution, a positive image of the pattern is obtained. After said development the foil is rinsed with water, wiped over on its imaged surface with dilute phosphoric acid (0.5%), and may now be used as a printing plate.

The compound corresponding to Formula 5 is prepared as follows:

5 g. of 6-hydroxy-(1',2'-1,2)-pyridobenzimidazole are dissolved in 170 cc. of warmed ethylene glycol monomethyl ether. After cooling the solution to 25° C. first 8 g. of naphthoquinone-(1,2)-diazide-(1)-7-sulfochloride are added, and subsequently, while agitating and dropwise, 25 cc. of a 10% sodium carbonate solution. The reaction mixture is agitated for 1 hour at 25° C., then heated for 15 min. in a water bath to 40° C. and cooled down. After cooling the reaction mixture is dropped in water, whereupon the reaction product precipitates. It is separated by means of a suction filter, suspended first in a luke-warm sodium carbonate solution, then repeatedly in luke-warm water, drawn off again, and finally dried in a vacuum at 40° C. After recrystallization from ethylene glycol monomethyl ether the compound corresponding to Formula 5 forms a greenish yellow powder which begins to decompose at 150° C.

The naphthoquinone-(1,2)-diazide-(1)-7-sulfochloride is prepared from the corresponding sulfonic acid by heating it for two hours to 60° C. with ten times its own quantity of chlorosulfonic acid and subsequently pouring the mixture onto ice. After recrystallization from benzene the compound melts at 158–159° C. with decomposition.

*Example 6*

A 1.5% solution of the compound corresponding to Formula 6 in ethylene glycol monomethyl ether is coated by means of a plate whirler onto an aluminum foil which may be either unbrushed or roughened, and the coated solution is subsequently dried. After drying the light sensitive layer is exposed under a transparent positive pattern and the exposed layer is developed first with a 0.5% phosphoric acid, then with a solution containing 0.6% of phosphoric acid and 16% of gum arabic. A negative image of the pattern is obtained. The foil is now inked with greasy ink and used as a printing plate.

If, after exposure under a positive pattern, the layer is wiped over with a 3% aqueous trisodium phosphate solution, a positive image of the pattern is obtained. After said development the foil is rinsed with water, wiped over on its imaged surface with dilute phosphoric acid (0.5%), and may now be used as a printing plate.

The compound corresponding to Formula 6 is prepared as follows:

5 g. of 6-hydroxy-(1',2'-1,2)-pyridobenzimidazole are dissolved in 170 cc. of warmed ethylene glycol monomethyl ether. After cooling the solution to 25° C. it is mixed with 6.6 g. of benzoquinone-(1,2)-diazide-(2)-4-sulfochloride and then 25 cc. of a 10% sodium carbonate solution are added dropwise while agitating. The reaction mixture is agitated for one hour at 25° C., then heated for half an hour to 40° C. in a water bath and finally cooled down. After cooling, the reaction mixture is cautiously dropped into water, whereupon the reaction product precipitates. It is separated by means of a suction filter, suspended first in a luke-warm sodium carbonate solution, then repeatedly in luke-warm water, drawn off again, and finally dried in a vacuum at 40° C. After recrystallization from ethylene glycol monomethyl ether the compound corresponding to Formula 6 forms a brown powder which begins to decompose at 180° C.

The benzoquinone-(1,2)-diazide-(2)-4-sulfochloride is prepared from the sodium salt of the corresponding sulfonic acid by heating this substance for one hour to 100° C. with ten times its own quantity of chlorosulfonic acid and then pouring the mixture onto ice. After recrystallization from benzene the benzoquinone-(1,2)-diazide-(2)-4-sulfochloride thus obtained melts at 110–112° C. with decomposition.

*Example 7*

A grained zinc plate is brushed for 30 seconds with a 5% solution of alum in a 5% aqueous acetic acid, rinsed with water and then dried. By means of a plate-whirler the dried zinc plate is then coated with a 3% solution of the diazo compound corresponding to Formula 1 in ethylene glycol monomethyl ether and subsequently dried with warm air. The light-sensitive layer thus prepared is subsequently exposed under a negative transparent original, using e.g. an 18 amp. arc lamp at a distance of 70 cm. and for a period of about 2 minutes. The exposed layer is developed by wiping over with a 5% aqueous solution of phosphoric acid. Subsequently, the developed foil is wiped over, as is the custom with zinc plates, with an aqueous solution containing 22.5 g. of primary sodium phosphate and 27.5 g. of ammonium chloride, dissolved in 1 liter of water. After inking with greasy ink it may be used as a positive printing plate.

*Example 8*

A paper printing foil, e.g. of the kind prepared according to U.S. Patent 2,534,588, is coated with a 1.5% solution of the compound corresponding to Formula 1 in ethylene glycol monomethyl ether and subsequently dried with warm air. The light-sensitive layer thus produced is then exposed under a negative transparent original and developed with a 2% aqueous solution of phosphoric acid. The developed foil is inked with greasy ink, either manually or in the printing machine. A positive printing plate is obtained.

What is claimed is:

1. A compound having the formula

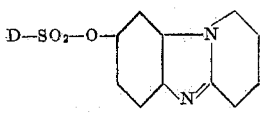

in which D is selected from the group consisting of ortho-benzo- and ortho-naphthoquinone diazide radicals.

2. A compound having the formula

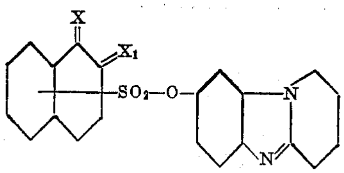

in which X and $X_1$ are selected from the group consisting of $N_2$ and O and are different.

3. A compound having the formula

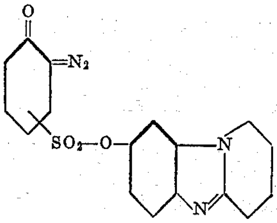

4. A compound having the formula

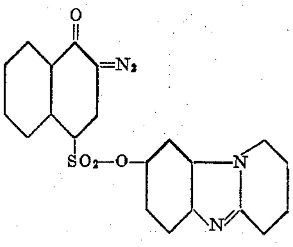

5. A compound having the formula

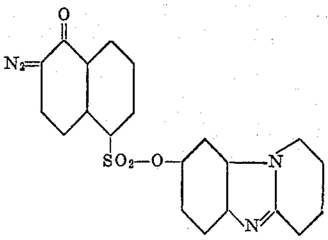

6. A compound having the formula

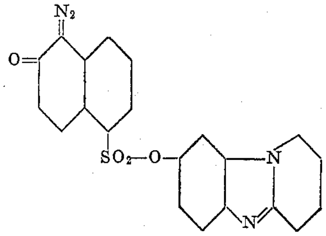

7. A compound having the formula

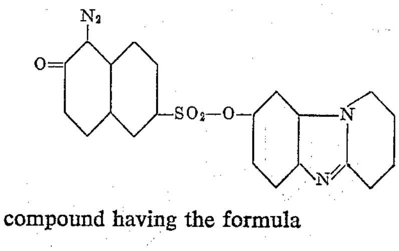

8. A compound having the formula

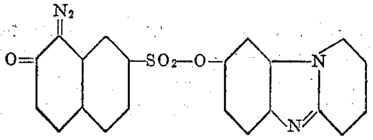

9. A presensitized printing plate comprising a base material having a coating thereon comprising a compound having the formula

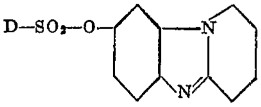

in which D is selected from the group consisting of ortho-benzo- and ortho-naphthoquinone diazide radicals.

10. A presensitized printing plate comprising a base material having a coating thereon comprising a compound having the formula

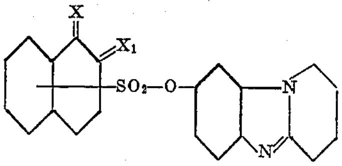

in which X and $X_1$ are selected from the group consisting of $N_2$ and O and are different.

11. A presensitized printing plate comprising a base material having a coating thereon comprising a compound having the formula

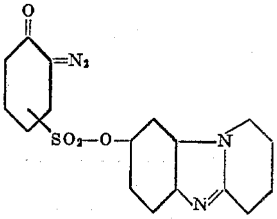

12. A presensitized printing plate comprising a base material having a coating thereon comprising a compound having the formula

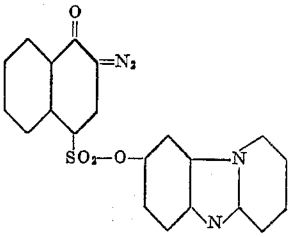

13. A presensitized printing plate comprising a base material having a coating thereon comprising a compound having the formula

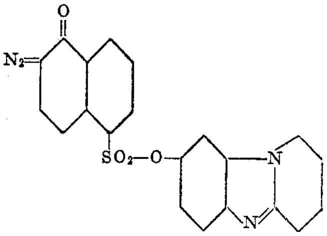

14. A presensitized printing plate comprising a base material having a coating thereon comprising a compound having the formula

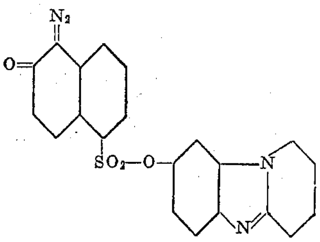

15. A presensitized printing plate comprising a base material having a coating thereon comprising a compound having the formula

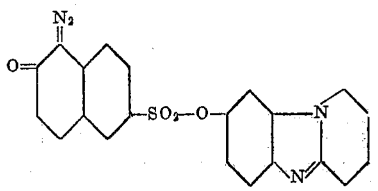

16. A presensitized printing plate comprising a base material having a coating thereon comprising a compound having the formula

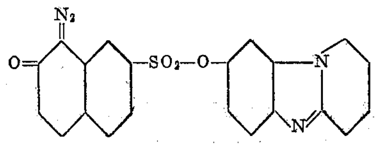

17. A process for developing a printing plate which comprises exposing to light under a master a plate having a compound thereon of the formula

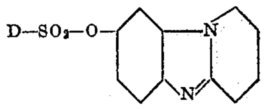

in which D is selected from the group consisting of ortho-benzo- and ortho-naphthoquinone diazide radicals; to thereby form a decomposition product in the light struck areas and treating the exposed plate with a developer selected from the group consisting of a weakly alkaline solution, an acid, an acid salt, and an organic solvent.

18. A process for developing a printing plate which comprises exposing to light under a master a plate having a compound thereon of the formula

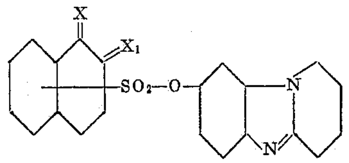

in which X and $X_1$ are selected from the group consisting of $N_2$ and O and are different; to thereby form a decomposition product in the light struck areas and treating the exposed plate with a developer selected from the group consisting of a weakly alkaline solution, an acid, an acid salt, and an organic solvent.

19. A process for developing a printing plate which comprises exposing to light under a master a plate having a compound thereon of the formula

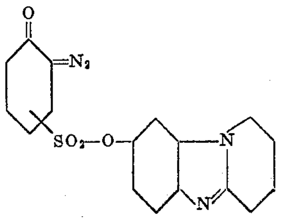

to thereby form a decomposition product in the light struck areas and treating the exposed plate with a developer selected from the group consisting of a weakly alkaline solution, an acid, an acid salt, and an organic solvent.

20. A process for developing a printing plate which comprises exposing to light under a master a plate having a compound thereon of the formula

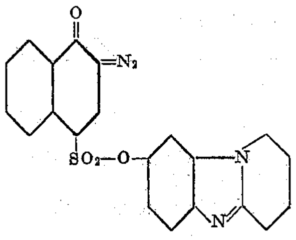

to thereby form a decomposition product in the light struck areas and treating the exposed plate with a developer selected from the group consisting of a weakly alkaline solution, an acid, an acid salt, and an organic solvent.

21. A process for developing a printing plate which comprises exposing to light under a master a plate having a compound thereon of the formula

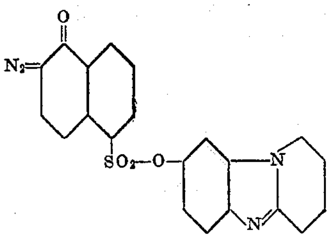

to thereby form a decomposition product in the light struck areas and treating the exposed plate with a developer selected from the group consisting of a weakly alkaline solution, an acid, an acid salt, and an organic solvent.

22. A process for developing a printing plate which comprises exposing to light under a master a plate having a compound thereon of the formula

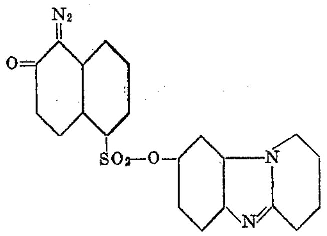

to thereby form a decomposition product in the light struck areas and treating the exposed plate with a developer selected from the group consisting of a weakly alkaline solution, an acid, an acid salt, and an organic solvent.

23. A process for developing a printing plate which comprises exposing to light under a master a plate having a compound thereon of the formula

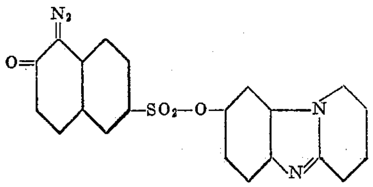

to thereby form a decomposition product in the light struck areas and treating the exposed plate with a developer selected from the group consisting of a weakly alkaline solution, an acid, an acid salt, and an organic solvent.

24. A process for developing a printing plate which comprises exposing to light under a master a plate having a compound thereon of the formula

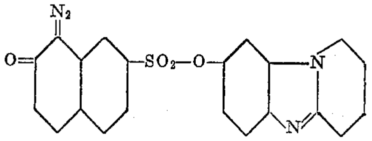

to thereby form a decomposition product in the light struck areas and treating the exposed plate with a developer selected from the group consisting of a weakly alkaline solution, an acid, an acid salt, and an organic solvent.

References Cited in the file of this patent

FOREIGN PATENTS

| | | |
|---|---|---|
| 521,631 | Belgium | Aug. 14, 1953 |
| 1,086,894 | France | Aug. 18, 1954 |